United States Patent [19]

Baccini

[11] 4,365,166

[45] Dec. 21, 1982

[54] WIND ENGINE WITH RADIAL FLOW WHEEL, PARTIALLY PROTECTED, WITH FIXED BLADES OF LARGE DIAMETER

[76] Inventor: Adolfo Baccini, corso Italia 23, Firenze, Italy

[21] Appl. No.: 180,116

[22] Filed: Aug. 21, 1980

[30] Foreign Application Priority Data

Aug. 28, 1979 [IT] Italy .................................. 9520 A/79

[51] Int. Cl.³ .............................................. F03D 3/04
[52] U.S. Cl. .......................................... 290/55; 290/44
[58] Field of Search ..................... 290/44, 55; 416/9

[56] References Cited

U.S. PATENT DOCUMENTS

| | | | |
|---|---|---|---|
| 3,942,025 | 3/1976 | Ri | 290/55 |
| 4,127,356 | 11/1978 | Murphy | 290/55 X |
| 4,166,222 | 8/1979 | Hanley | 290/55 |

Primary Examiner—Ulysses E. Weldon
Assistant Examiner—W. E. Duncanson, Jr.
Attorney, Agent, or Firm—McAulay, Fields, Fisher, Goldstein & Nissen

[57] ABSTRACT

A flowing air or wind responsive engine having a shaft supported by a carrying construction with a radial flow wheel with blades of large diameter fixed to the shaft, the shaft being maintained in a generally horizontal position, and the wheel is provided with several blades each of which is fixed to the shaft to form a spoke wheel arrangement, the wheel being rotatable about its own vertical axis of symmetry at the top of the carrying construction. Wind braces are connected to the blades so as to connect them together to form a sturdy structure which is non-deformable under the pressure of a strong wind.

3 Claims, 3 Drawing Figures

WIND ENGINE WITH RADIAL FLOW WHEEL, PARTIALLY PROTECTED, WITH FIXED BLADES OF LARGE DIAMETER

BACKGROUND OF THE INVENTION

The wind, as is known, is a natural, inexhaustible source of kinetic energy. The utilization of wind energy has until now been limited to rather low power values in connection also with the preference of constructing wind engines with axial flow wheels with two or three helical, dirigible blades or sails, with an index of rapid operation which is a reason for limited length of the blades.

On the other hand, as it is known that the power delivered by a wind engine is directly proportional to the square of the diameter of the wheel, it appears necessary to make a wheel of large diameter in order to obtain greater power. The object of the present invention is a wind engine with radial flow wheel, partially protected, with fixed blades of large diameter and therefore capable of delivering a high power.

The invention will now be better described with reference to the annexed drawings, showing a schematic form of realization, but not to be considered in a limiting sense; wherein:

Figure 1:
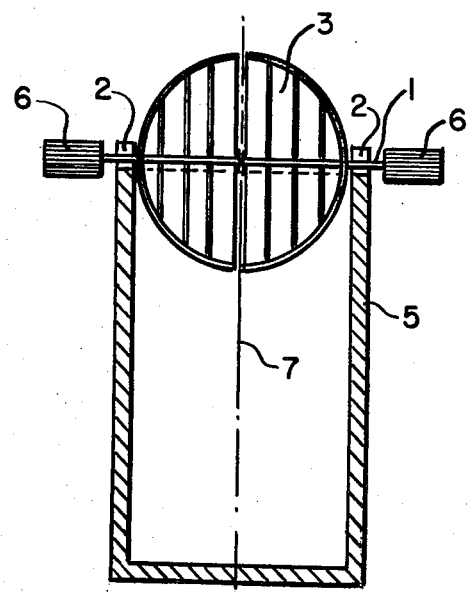
FIG. 1 represents the front view, partly in section, of a wind engine according to the invention, in position of installation.
Figure 2:
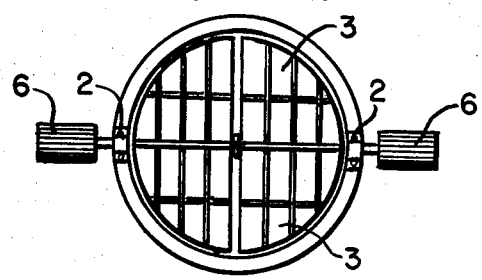
FIG. 2 represents the plan view thereof.
Figure 3:
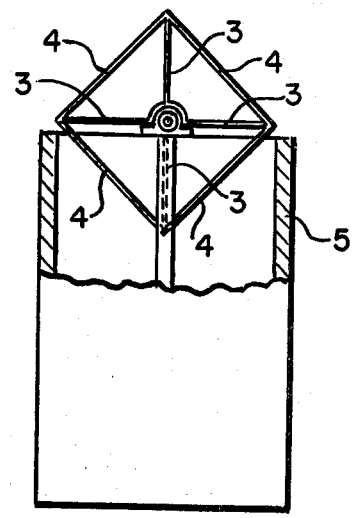
FIG. 3 represents the side view thereof, partly in section.

Reduced to its essential structure and with reference to the annexed drawings, a wind engine according to the present invention comprises: a wheel with horizontal shaft 1, mounted loosely on two end supports 2 and to which are fixed four semicircular blades 3, in crossed arrangement. In consideration of the appreciable dimensions of the blades, which may exceed 15 m in diameter, each of them is advantageously formed by a carrying structure, for example reticular with elements disposed parallel and perpendicular to the shaft 1 whose free ends are fixed to a contour element, and by a thin and rigid curtain wall; the blades being advantageously connected together by means of rigid wind braces 4 so as to form a sturdy structure undeformable under the pressure of even very strong wind.

Said supports 2 are applied rolling at the top of a construction 5 e.g. with circular base and of a height adapted to the diameter of the blades to permit shielding the blades which are located below the shaft 1 and furthermore to obtain the rotation of the wheel about its vertical diametrical axis so as to bring about the condition of radial flow of the wind with the cooperation of known directional means (not shown in the drawing for simplification) and whose tail, disposed in a plane perpendicular to the shaft 1, is automatically orientable according to the direction of the wind.

It is provided to transform the mechanical energy collected on the shaft 1 by means of an electric current generator 6 mounted directly on one or both ends of the shaft 1 or otherwise placed in the construction 5 in a position below the wheel, by means of a suitable transmission member (7) as descending chain or shaft, placed externally or at the center of the wheel. In that case the blades of the wheel are sectioned as illustrated in FIG. 1 to permit their rotation. In the practice the details of execution may vary in equivalent manner as to form, dimensions, arrangement of the elements, nature of the materials used without thereby going outside the scope of the idea of solution adopted and therefore remaining within the limits of protection accorded by the present patent of industrial invention.

I claim:

1. In a wind engine having a horizontal shaft, the improvement comprising:
   a radial flow wheel with blades of large diameter fixed to said horizontal shaft;
   a wall for shielding said blades during rotation thereof when said blades are in a position below said shaft;
   said wheel having several blades each of which is fixed to said shaft;
   said blades being fixed to said shaft to form a spoke wheel arrangement with a semi-circular profile arrangement;
   wind braces connected said blades together to form a sturdy structure non-deformable under the pressure of a strong wind;
   a cylindrical carrying construction for said shaft, said wall forming part of said carrying construction;
   said wheel having means to permit it to rotate about its own vertical axis of symmetry at the top of said carrying construction whereby to bring about the condition of radial flow of the wind; and
   at least one current generator mounted at each end of said shaft to transform the mechanical energy produced by said shaft into electrical energy.

2. In a wind engine as claimed in claim 1,
   at least one current generator associated with said shaft responsive to the energy of said shaft for the collection of the energy,
   a transmission member coupled to said generator including a chain at the center of said wheel and in a position below thereof,
   said blades being sectioned to permit their rotation.

3. In a wind engine as claimed in claim 1 or 2, the dimensions of said blades exceeding 15 m in diameter.

* * * * *